United States Patent
Wang et al.

(10) Patent No.: US 11,784,769 B2
(45) Date of Patent: Oct. 10, 2023

(54) AGC ASPECTS OF SIDELINK DMRS BUNDLING

(71) Applicant: QUALCOMM Incorporated, San Diego, CA (US)

(72) Inventors: Xiaojie Wang, Hillsborough, NJ (US); Xiaoxia Zhang, San Diego, CA (US); Jing Sun, San Diego, CA (US); Piyush Gupta, Bridgewater, NJ (US); Junyi Li, Fairless Hills, PA (US); Peter Gaal, San Diego, CA (US); Sony Akkarakaran, Poway, CA (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/355,014

(22) Filed: Jun. 22, 2021

(65) Prior Publication Data

US 2022/0407645 A1 Dec. 22, 2022

(51) Int. Cl.
*H04W 4/00* (2018.01)
*H04L 5/00* (2006.01)
*H04W 72/0446* (2023.01)
*H04W 72/20* (2023.01)

(52) U.S. Cl.
CPC ....... *H04L 5/0048* (2013.01); *H04W 72/0446* (2013.01); *H04W 72/20* (2023.01)

(58) Field of Classification Search
CPC ....... H04L 5/0048; H04L 5/05; H04L 5/0053; H04L 27/26025; H04W 72/20; H04W 72/0446
See application file for complete search history.

(56) References Cited

U.S. PATENT DOCUMENTS

| | | | |
|---|---|---|---|
| 2020/0059956 A1* | 2/2020 | Rahman | H04B 7/0421 |
| 2020/0322024 A1* | 10/2020 | Cheng | H04L 5/001 |
| 2021/0099265 A1* | 4/2021 | Shin | H04W 72/0453 |
| 2021/0105760 A1* | 4/2021 | Chen | H04W 72/0446 |
| 2021/0112505 A1* | 4/2021 | Li | H04L 27/2607 |
| 2021/0119843 A1* | 4/2021 | Zhang | H04L 27/2613 |
| 2021/0152408 A1* | 5/2021 | Yeo | H04W 72/02 |
| 2021/0153168 A1* | 5/2021 | Sarkis | H04W 72/02 |
| 2021/0167917 A1* | 6/2021 | Zhao | H04L 5/0051 |
| 2021/0314933 A1* | 10/2021 | Zhang | H04W 72/0446 |
| 2021/0329633 A1* | 10/2021 | Xing | H04W 72/0446 |
| 2021/0352597 A1* | 11/2021 | Do | H04W 52/52 |
| 2021/0385822 A1* | 12/2021 | Chae | H04W 72/02 |
| 2022/0166588 A1* | 5/2022 | Hwang | H04L 5/0051 |

* cited by examiner

*Primary Examiner* — Abdelnabi O Musa
(74) *Attorney, Agent, or Firm* — Procopio, Cory, Hargreaves & Savitch LLP

(57) ABSTRACT

A first UE may select, based on a resource pool configuration for a sidelink communication, at least one of a first slot in time or a second slot in time of a plurality of slots. The plurality of slots may be associated with DMRS bundling. The first UE may configure, based on the DMRS bundling, at least one of one or more symbols in the first slot in time from a gap symbol to a non-gap symbol or one or more symbols in the second slot in time from an AGC symbol to a non-AGC symbol. The first UE may transmit, to a second UE, an indication of the configuration of the at least one of the one or more symbols in the first slot in time or the one or more symbols in the second slot in time.

30 Claims, 12 Drawing Sheets

AGC ASPECTS OF SIDELINK DMRS BUNDLING

TECHNICAL FIELD

The present disclosure relates generally to communication systems, and more particularly, to automatic gain control (AGC) aspects of sidelink demodulation reference signal (DMRS) bundling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be at a first user equipment (UE) and may be configured to select, based on a resource pool configuration for a sidelink (SL) communication, at least one of a first slot in time of a plurality of slots or a second slot in time of the plurality of slots, the plurality of slots associated with demodulation reference signal (DMRS) bundling; configure at least one of one or more symbols in the first slot in time from a gap symbol to a non-gap symbol or one or more symbols in the second slot in time from an automatic gain control (AGC) symbol to a non-AGC symbol; and transmit, to a second UE, an indication of the configuration of the at least one of the one or more symbols in the first slot in time or the one or more symbols in the second slot in time.

In an aspect of the disclosure, a method, a computer-readable medium, and an apparatus are provided. The apparatus may be at a second UE and may be configured to receive, from a first UE, an indication of a configuration of at least one of one or more symbols in a first slot in time from a gap symbol to a non-gap symbol or one or more symbols in a second slot in time from an AGC symbol to a non-AGC symbol, the one or more symbols in the first slot in time and the one or more symbols in the second slot in time corresponding to a plurality of slots associated with DMRS bundling and a resource pool configuration for a SL communication; and receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
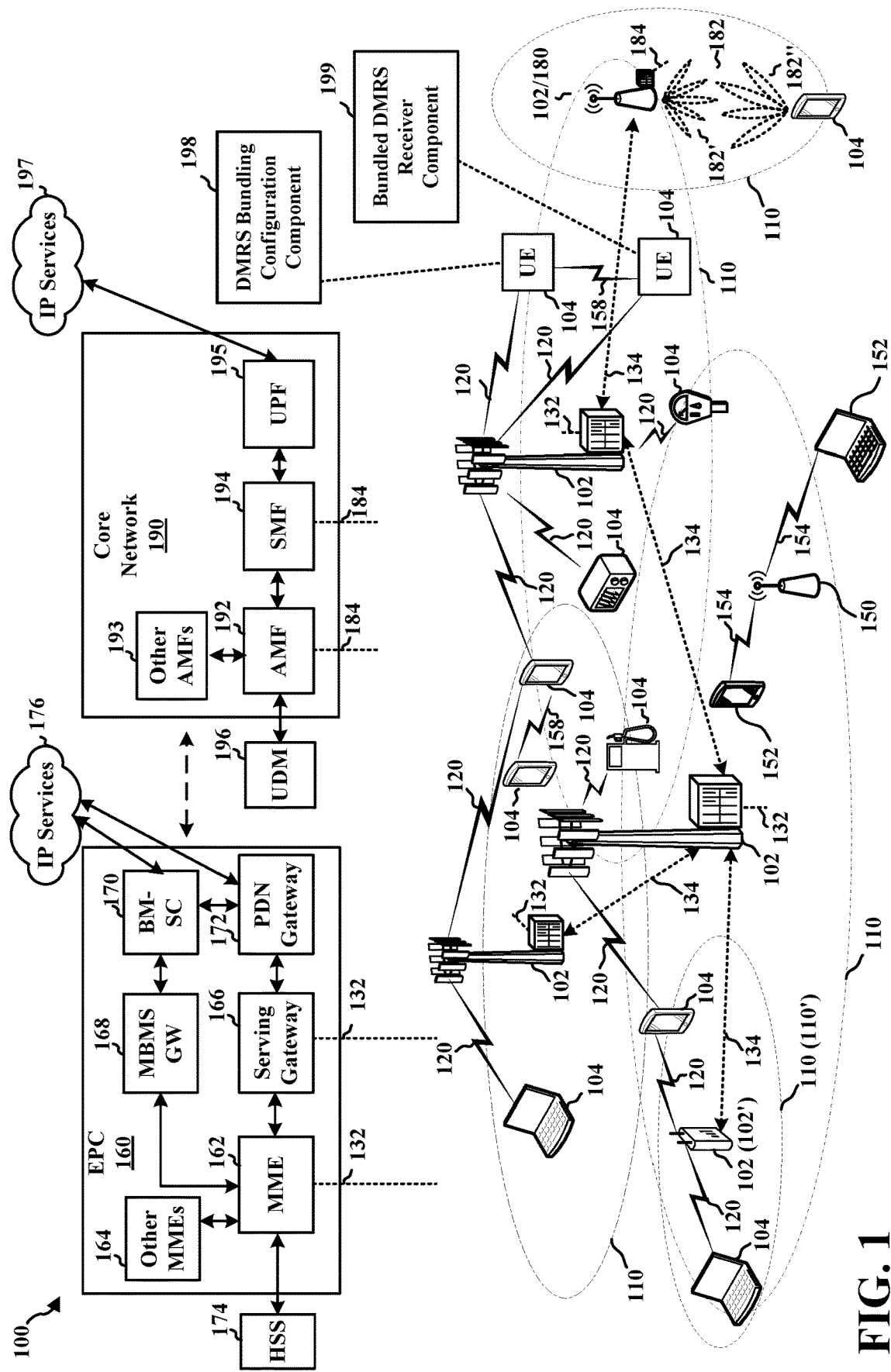
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a demodulation reference signal (DMRS) bundling configuration component 198 configured to select, based on a resource pool configuration for a sidelink (SL) communication, at least one of a first slot in time of a plurality of slots or a second slot in time of the plurality of slots, the plurality of slots associated with DMRS bundling; configure at least one of one or more symbols in the first slot in time from a gap symbol to a non-gap symbol or one or more symbols in the second slot in time from an automatic gain control (AGC) symbol to a non-AGC symbol; and transmit, to a second UE, an indication of the configuration of the at least one of the one or more symbols in the first slot in time or the one or more symbols in the second slot in time.

In certain aspects, the base station 180 may include a bundled DMRS receiver component 199 configured to receive, from a first UE, an indication of a configuration of at least one of one or more symbols in a first slot in time from a gap symbol to a non-gap symbol or one or more symbols in a second slot in time from an AGC symbol to a non-AGC symbol, the one or more symbols in the first slot in time and the one or more symbols in the second slot in time corresponding to a plurality of slots associated with DMRS bundling and a resource pool configuration for a SL communication; and receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol. Although the following description may be focused on 5G NR, the concepts described herein may be applicable to other similar areas, such as LTE, LTE-A, CDMA, GSM, and other wireless technologies.

Figure 2:
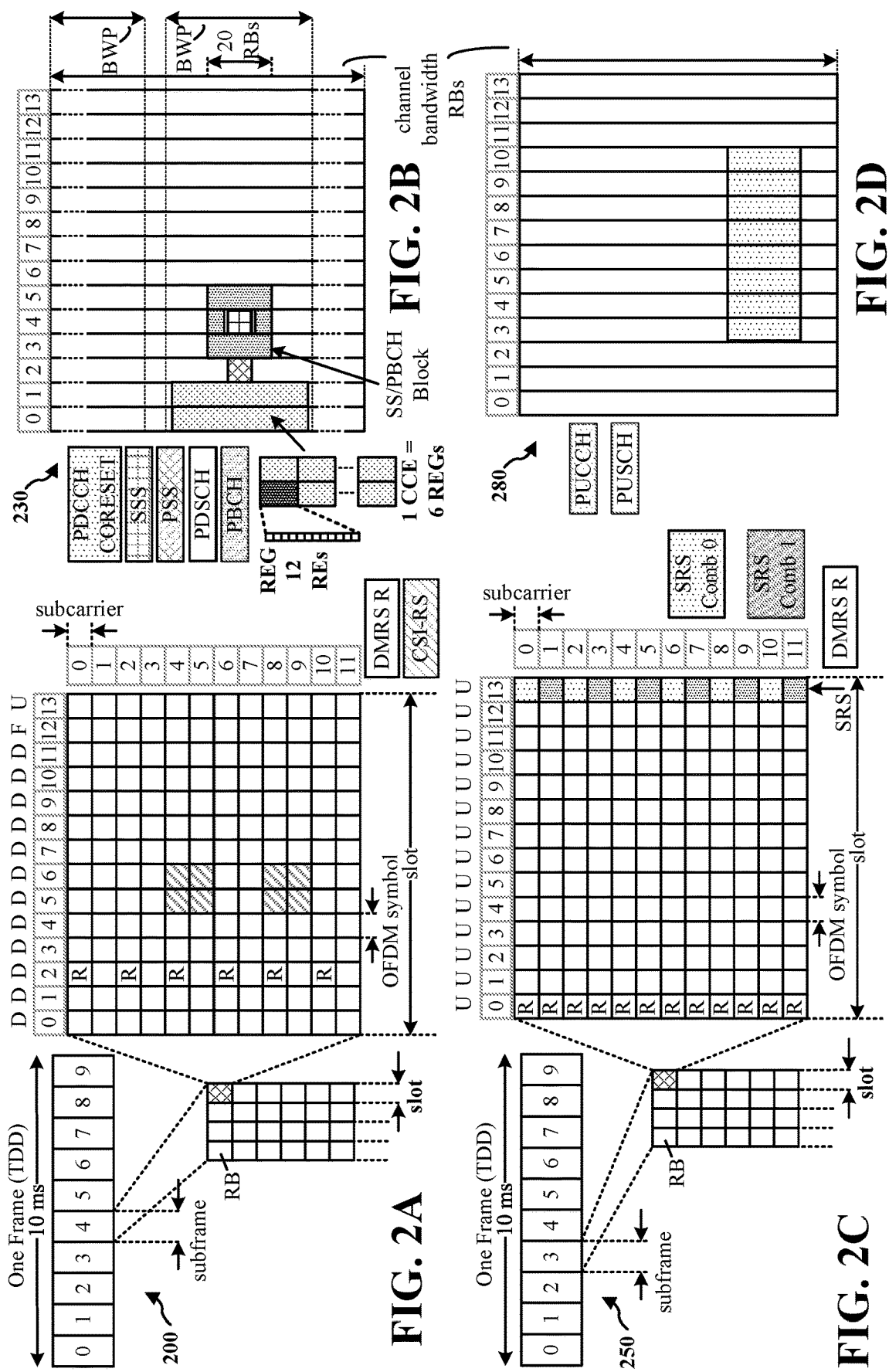
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include DM-RS (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
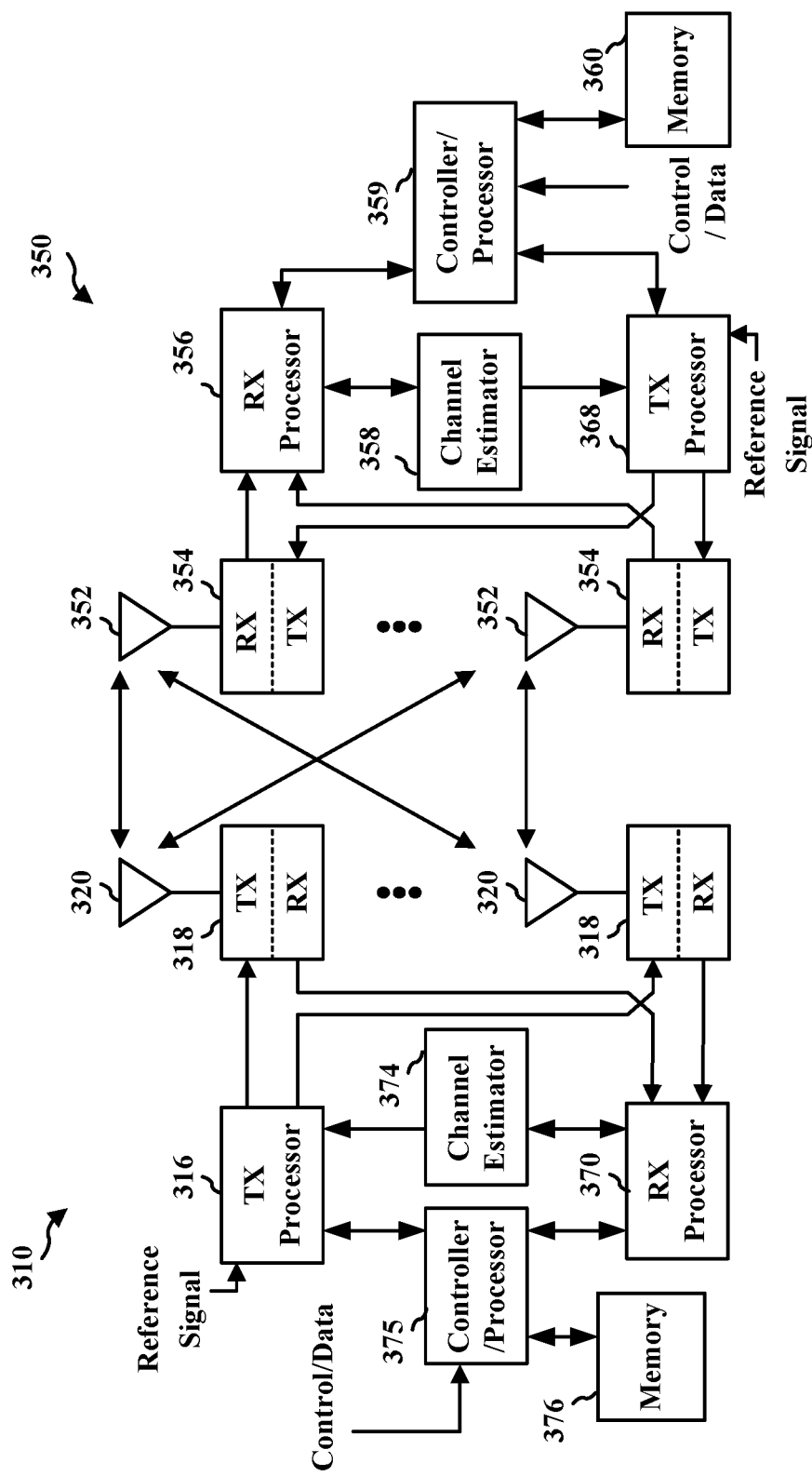
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the DMRS bundling configuration component 198 of FIG. 1.

At least one of the TX processor 368, the RX processor 356, and the controller/processor 359 may be configured to perform aspects in connection with the bundled DMRS receiver component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
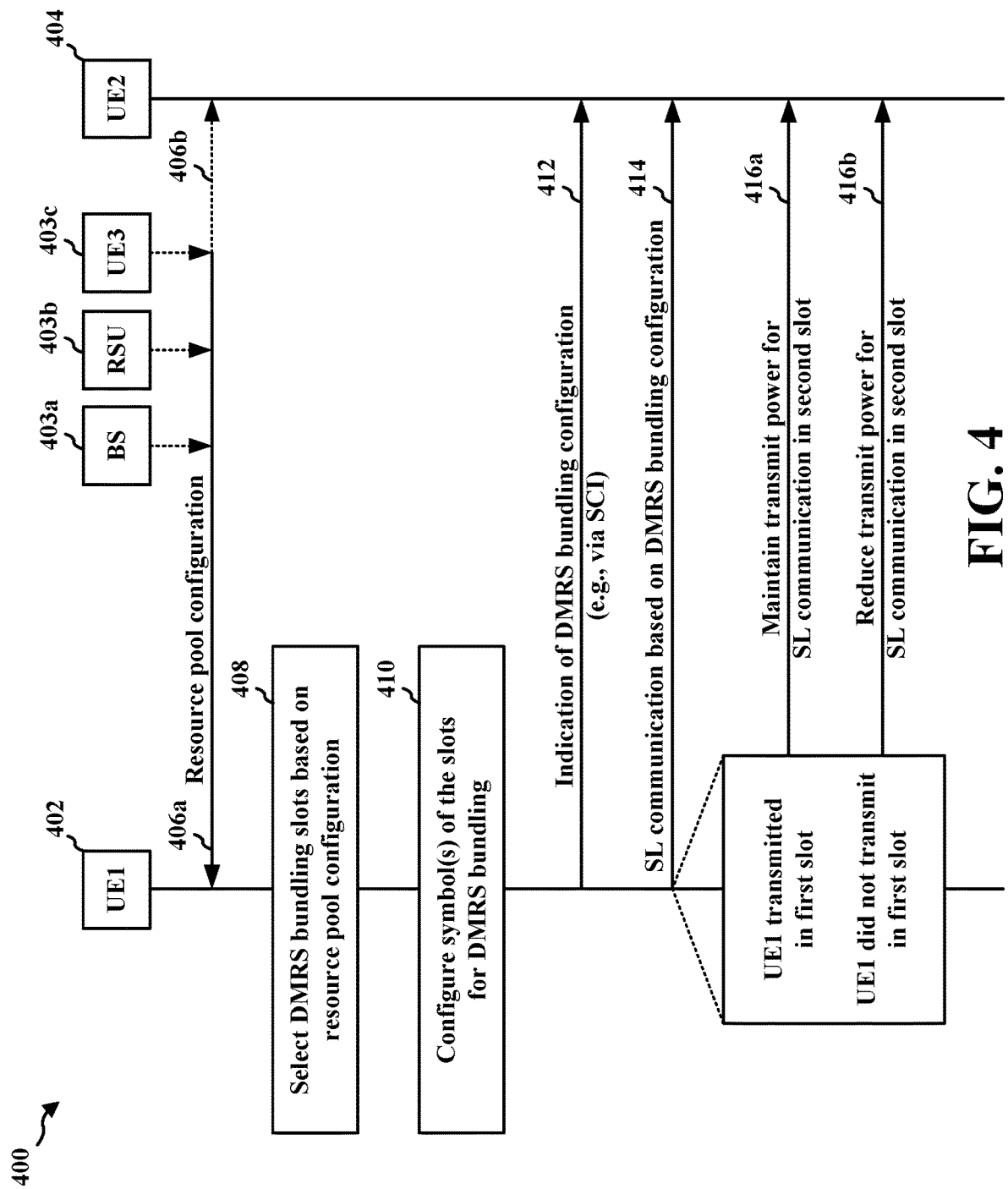
FIG. 4 is a call flow diagram illustrating communications between a first UE and a second UE.

FIG. 4 is a call flow diagram 400 illustrating communications between a first UE 402 and a second UE 404. At 406a, the first UE 402 may receive a resource pool configuration for sidelink communication. The resource pool configuration may be indicative of at least one slot (e.g., a subset of slots) of a plurality of slots to be used for DMRS bundling on sidelink. The resource pool configuration may be received, at 406, from any of a base station 403a, a roadside unit (RSU) 403b, or a third UE 403c. In some examples, the second UE 404 may receive the resource pool configuration, at 406b, from any of the base station 403a, the RSU 403b, or the third UE 403c, such that the first UE 402 may receive, at 406a, the resource pool configuration from the second UE 404.

At 408, the first UE 402 may select DMRS bundling slots based on the resource pool configuration received, at 406a. That is, the resource pool configuration may be indicative of slots to be used for DMRS bundling. The DMRS bundling slots may correspond to the subset of slots of the plurality of slots, whereas other slots that are included in the plurality of slots, but not included in the subset of slots, may correspond to non-DMRS bundling slots.

At 410, the first UE 402 may configure symbol(s) of the slots for DMRS bundling. For example, the first UE 402 may configure, at 410, a last symbol of a first slot in time, such that the last symbol of the first slot in time is adjusted from a gap symbol to a PSSCH symbol. The first UE 402 may also configure, at 410, a first symbol of a second slot in time to either omit or correspond to an AGC symbol. At 412, the first UE 402 may transmit an indication of the DMRS bundling configuration to the second UE 404. In examples, the indication of the DMRS bundling configuration may be transmitted, at 412, to the second UE 404 via sidelink control information (SCI).

At 414, the first UE 402 may transmit a sidelink communication to the second UE 404 based on the DMRS bundling configuration. If the first UE 402 transmitted a first sidelink communication to the second UE 404 in a first slot in time corresponding to a non-DMRS bundling slot, the first UE 402 may maintain a transmit power for transmitting, at 416a, a second sidelink transmission/repetition to the second UE 404 in a second slot in time corresponding to a DMRS bundling slot. Alternatively, if the first UE 402 did not transmit a first sidelink communication to the second UE 404 in a first slot in time corresponding to a non-DMRS bundling slot, the first UE 402 may reduce a transmit power for transmitting, at 416b, a second sidelink transmission/repetition to the second UE 404 in a second slot in time corresponding to a DMRS bundling slot. In some examples, the transmit power, at 416b, may be reduced to 0, such that the first UE 402 does not transmit the second sidelink transmission/repetition in the second slot in time that corresponds to the DMRS bundling slot.

Figure 5:
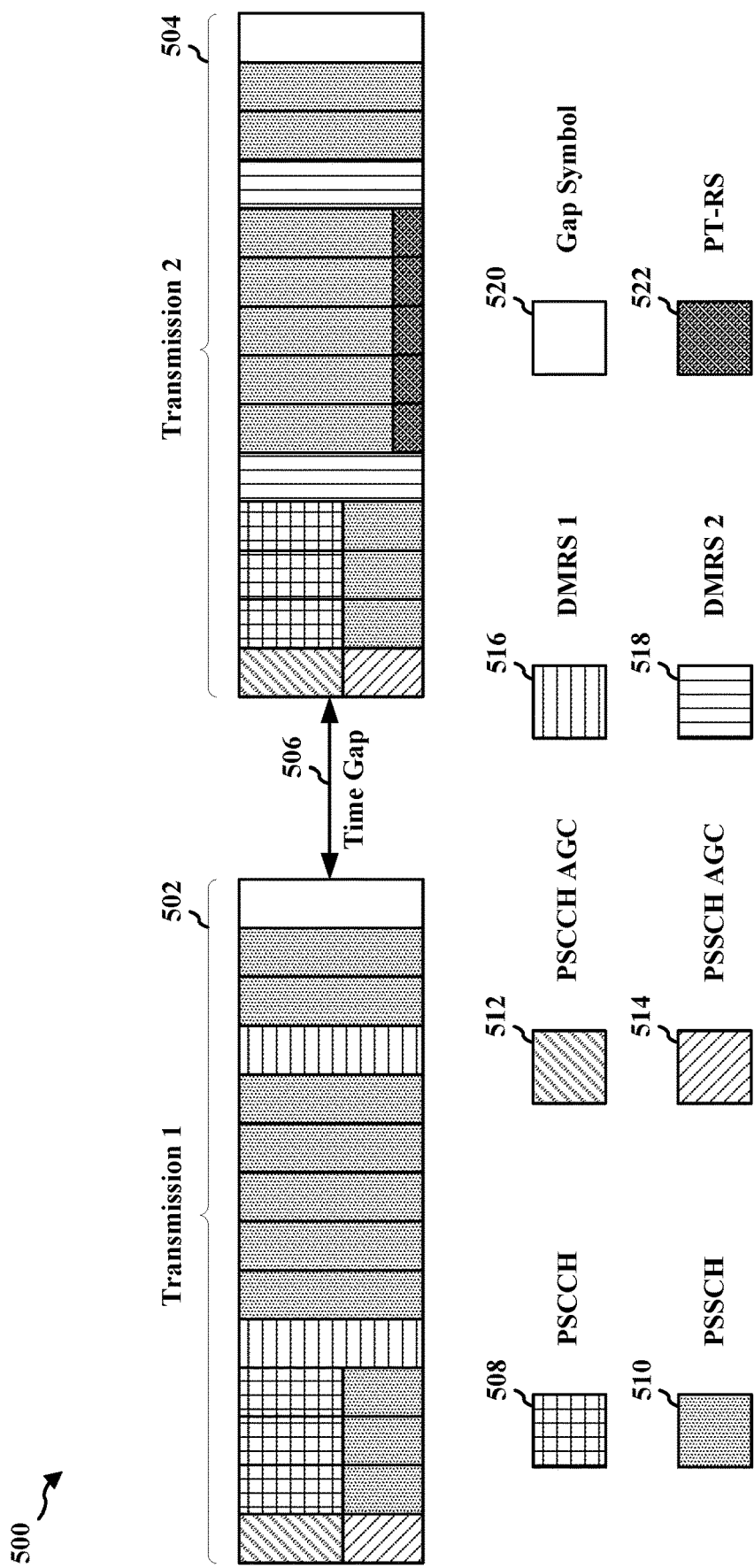
FIG. 5 is a diagram that illustrates sidelink DMRS bundling.

FIG. 5 is a diagram 500 that illustrates sidelink DMRS bundling. DMRS bundling, which may also be referred to as joint channel estimation (JCE), may be utilized for sidelink communications between low mobility UEs as well as for communications over a Uu link.

A UE capability for performing PUSCH/PUCCH DMRS bundling over the Uu link may depend on whether the UE is able to maintain phase continuity during the DMRS bundling procedure. In some cases, phase continuity may be maintained for performing DMRS bundling and, in other cases, the UE may be unable to maintain phase continuity, such that the UE may be unable to perform the DMRS bundling. Maintaining phase continuity to perform DMRS bundling may allow the UE to utilize a plurality of DMRSs to improve channel estimation accuracy. DMRS bundling may also be used to improve a detection rate and/or coverage of corresponding channels. In certain instances, an ability of the UE to maintain phase continuity may depend on whether the PUSCH/PUCCH transmissions are contiguous. If the PUSCH/PUCCH transmissions are not contiguous, a duration of a time gap between the transmissions may impact an ability of the UE to maintain phase continuity.

Two PSSCH repetitions (e.g., associated with a first sidelink transmission 502 and a second sidelink transmission 504) including a same channel matrix H for a transmitter and a receiver may be determined based on:

$$y_1 = H \cdot P x_1 + n_1,$$

$$y_2 = D_r \cdot H \cdot D_t \cdot P x_2 + n_2,$$

where $y_1$ corresponds to a first PSSCH transmission, $y_2$ corresponds to a second PSSCH transmission, $x_1$ corresponds to a waveform of the transmitter prior to precoding, $x_2$ corresponds to a waveform of the receiver prior to precoding, $D_r$ and $D_t$ are indicative of an RF change at the receiver and the transmitter, respectively, P corresponds to a precoding matrix, and $n_1$ and $n_2$ correspond to noise values. The PSSCH channel 510 in sidelink may carry 1 packet associated with a physical signal indicated based on $x_1$ at the transmitter or based on $x_2$ at the receiver. The signal may be OFDMed based on data modeled in the time domain and converted to the frequency domain. The signal may also be a pilot signal that includes symbols for the data, or a reference signal (e.g., first DMRS 516 or second DMRS 518) that may be used for channel estimation. A waveform of the signal may be passed through the precoding matrix P, and subsequently through the channel matrix H.

The first PSSCH transmission $y_1$ (e.g., associated with the first sidelink transmission 502) may be repeated for the second PSSCH transmission $y_2$ (e.g., associated with the second sidelink transmission 504) to provide enhanced coverage. Given that $y_1$ and $y_2$ may correspond to separate transmissions, an RF change may occur over time in association with the hardware. Thus, the second waveform $x_2$ may be a same waveform or a different waveform than the first waveform $x_1$. Regardless of the waveforms $x_1$ and $x_2$, the values for $D_r$ and $D_t$ may be unchanged, as $D_r$ and $D_t$ may correspond to identity matrixes. The precoding matrix P and the channel matrix H may also remain unchanged. However, if conditions of the hardware at the transmitter or the receiver changes over time, a phase jump may be modeled based on $D_r$ and $D_t$, where $D_r$ may be indicative of the RF change at the receiver and $D_t$ may be indicative of the RF change at the transmitter.

For DMRS bundling/JCE, the transmitter and the receiver may maintain phase continuity across the first sidelink transmission 502 and the second sidelink transmission 504 of different antenna ports based on $D_r=D_t=I$. If both the transmitter and the receiver are able to maintain phase continuity across the sidelink transmissions 502-504 for the different antenna ports, $D_r$ and $D_t$ may be canceled from the equation, and $y_1$ and $y_2$ may be combined to estimate the channel more efficiently. However, such techniques may be sensitive to RF changes, which may cause phase continuity to be difficult for the UE to maintain and/or result in weak DMRS bundling by the UE. For weak DMRS bundling, the UE may determine a diagonal matrix based on D=diag $(a_1 e^{j\Theta_1}, \ldots )$, which may be associated with a phase shift and an amplitude change for each antenna port, where $a_1$ corresponds the amplitude change and $e^{j\Theta_1}$ corresponds to the phase shift. In some examples, maintaining amplitude continuity may be easier for the hardware than maintaining phase continuity (e.g., $a_1=1$). Therefore, the UE may be able to estimate D to enable JCE (e.g., for weak bundling occasions). Some techniques may be directed toward estimating/indicating $D_t$, as $D_r$ may be dependent on a receiver implementation and/or capability.

In an example, the UE may be unable to maintain phase continuity based on the transmissions associated with $x_1$ and $x_2$ occurring at different/non-contiguous times. For instance, the UE may have to perform hardware tuning and transmit the transmissions associated with $x_1$ and $x_2$ based on different powers, which may cause phase continuity to be difficult for the UE to maintain. Parameters for maintaining phase continuity between the sidelink transmissions 502-504 may correspond to a same transmission power, a same frequency domain resource allocation (FDRA), a same DMRS antenna port, a same codebook/precoding, a same Tx spatial parameter, a same timing advance (TA), and/or no downlink information being included in non-downlink transmissions. Elimination of a time gap 506 between adjacent transmissions (e.g., the first sidelink transmission 502 and the second sidelink transmission 504) may also allow the UE to maintain phase continuity or, if the time gap 506 is provided between the adjacent transmissions, the time gap 506 may be of a reduced duration that does not exceed a threshold for maintaining phase continuity.

DMRS bundling utilized to improve channel estimations for sidelink communications may be based on both the transmitter and the receiver maintaining phase continuity. In some cases, the first sidelink transmission 502 and the second sidelink transmission 504 may be separated by the time gap 506. The sidelink transmissions 502-504 may include a control channel (e.g., PSCCH 508) and a data channel (e.g., PSSCH 510). The data channel may include DMRS (e.g., first DMRS 516 or second DMRS 518). If the duration of the time gap 506 is below a threshold duration, the first DMRS 516 in the first sidelink transmission 502 and the second DMRS 518 in the second sidelink transmission 504 may be bundled to estimate a channel coefficient. The estimation may be based on an assumption that the channel does not change from the first sidelink transmission 502 to the second sidelink transmission 504.

When the UE transmits the first sidelink transmission 502, the transmission may be stopped for a gap symbol 520 corresponding to a last symbol of the first transmission slot. The UE may then resume transmitting (e.g., 2 ms later) via the second sidelink transmission 504. If the UE is slow to resume transmission, a loss of phase continuity may occur. A PT-RS 522 may be included in a second slot associated with the second sidelink transmission 504 for estimating a phase jump in cases where the UE is unable to maintain phase continuity. A receiver may utilize the PT-RS 522 to estimate the phase jump between the first sidelink transmission 502 and the second sidelink transmission 504. Based on the PT-RS 522, the DMRS symbols may be reduced or omitted and/or a lower density in time and frequency may be provided for a common phase error (CPE). The PT-RS 522 may also provide a lower overhead.

In a sidelink frame structure, a second symbol of the sidelink frame may be a duplication of the first symbol of the sidelink frame and may not carry new information. Thus, the first symbol may be used as an AGC symbol (e.g., including PSCCH AGC 512 and PSSCH AGC 514) to perform a calibration across repetitions for estimating an arriving signal power and tuning an analog-to-digital converter (ADC). The ADC may be sensitive to the arriving signal power. As such, the AGC symbol including the PSCCH AGC 512 and the PSSCH AGC 514 may be used to tune the arriving signal power based on a range of powers to increase an efficiency of the ADC. The tuning of the ADC may reduce clipping noise and/or quantization noise. If the ADC is not tuned for receiving the arriving signal power, and the arriving signal power is too high, the arriving signal power may be clipped, which may generate clipping noise for the signal that may decrease reception quality. Alternatively, if the ADC is not tuned for receiving the arriving signal power, and the arriving signal power is too low, the arriving signal power may cause the ADC to operate within a small range, which may generate quantization noise.

Figure 6:
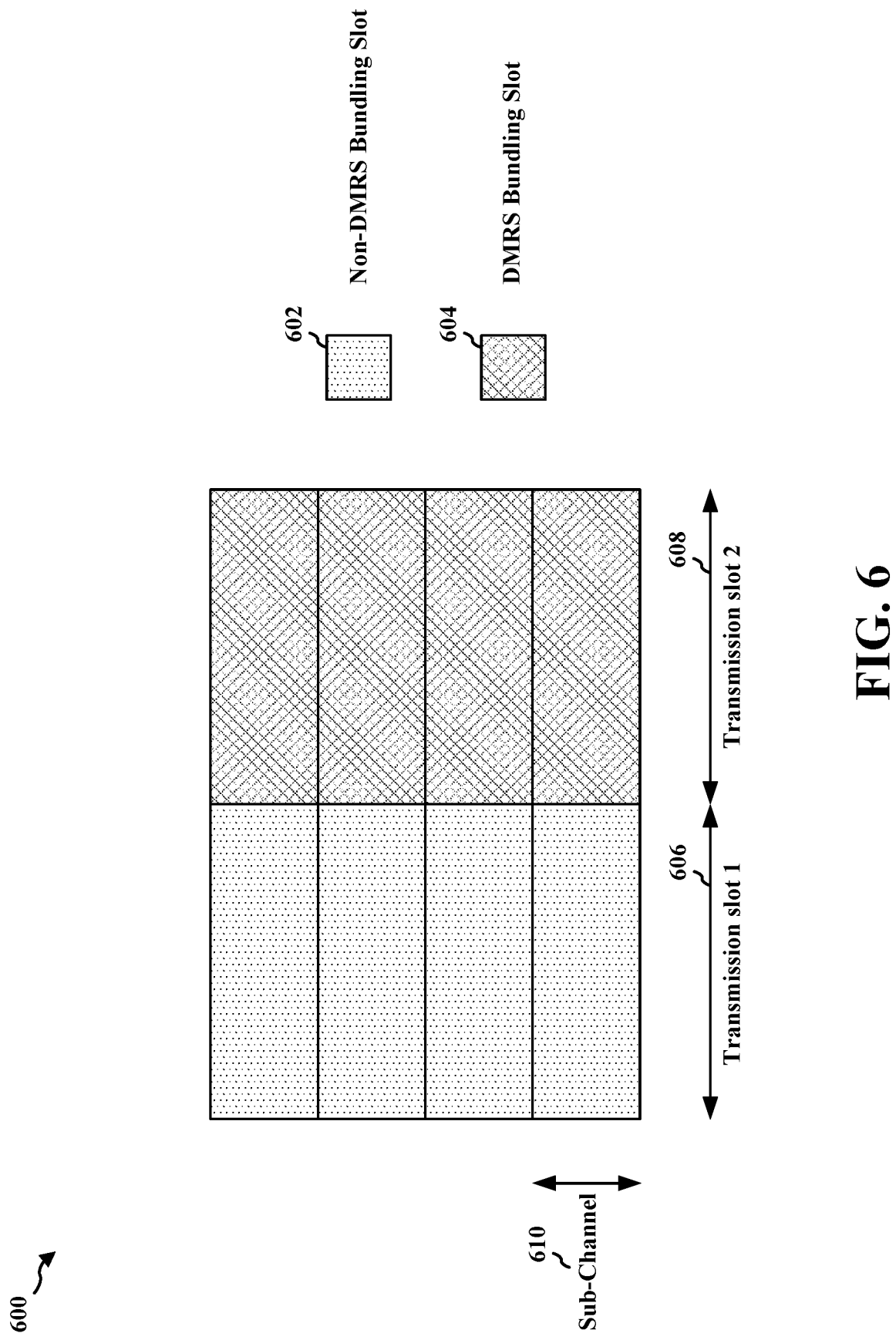
FIG. 6 is a diagram that illustrates a resource pool configuration for sidelink DMRS bundling.

FIG. 6 is a diagram 600 that illustrates a resource pool configuration for sidelink DMRS bundling. In a first example, a first signal power of a first sidelink transmission may be greater than a second signal power of a second sidelink transmission. While the first example may correspond to an inefficient use of a dynamic range for the ADC, a quality of the received signal may not be degraded based on clipping and/or quantization noise. The AGC may be tuned in the first sidelink transmission slot 606 and retuned in the second sidelink transmission slot 608. Thus, a larger transmit power for the first sidelink transmission may cause reduced efficiency for the ADC in association with the second sidelink transmission, but the second sidelink transmission may still be received without clipping and/or quantization noise. In some cases, AGC recalibration/retuning may even be skipped in the second transmission slot 608.

In a second example, the first signal power of the first sidelink transmission may be less than the second signal power of the second sidelink transmission. Clipping may occur in the second example based on tuning the AGC for the first sidelink transmission, but receiving a larger signal power for the second sidelink transmission. Thus, the larger/increased portion of the second signal power may be clipped. The second example may also cause inter-carrier interference (ICI) (e.g., between one or more sub-channels 610) that may degrade performance. Accordingly, the UE may reduce a transmit power for the second transmission slot 608 when the second transmission slot 608 corresponds to a DM-RS bundling slot 604 to avoid having the first signal power of the first sidelink transmission being less than the second signal power of the second sidelink transmission. Such techniques may cause the UE to operate based on the first example, where the first signal power of the first sidelink transmission is greater than the second signal power of the second sidelink transmission.

The UE may be configured to support DMRS bundling in order to maintain phase continuity based on a same transmit power. However, if the UE is not configured to support DMRS bundling, the UE may reduce the transmit power on a dedicated DMRS bundling slot 604. The resource pool may include a first transmission slot 606 corresponding to a non-DMRS bundling slot 602 that all UEs may utilize for transmission, and a second transmission slot 608 corresponding to a dedicated DMRS bundling slot 604. The UE may transmit a sidelink transmission in the first transmission slot 606 and a repetition of the sidelink transmission in the second transmission slot 608. If the UE transmits in the first transmission slot 606, the UE may maintain a same transmit power in the second transmission slot 608, or reduce the transmit power in the second transmission slot 608 by X dB, so that the UE does not cause a power increase for UEs that are performing DMRS bundling in the second transmission slot 608. X dB may be a resource pool configuration for maintaining phase continuity for DMRS bundling.

If a second UE has not transmitted in the first transmission slot 606, but proceeds to transmit in the second transmission slot 608 with a first transmission, the AGC calibration may not be accurate for UEs that are performing DMRS bundling in the second transmission slot 608. Thus, the second UE may not be allowed to use the second transmission slot 608 without having transmitted a first transmission in the first transmission slot 606. If a packet for the second UE arrives prior to the first transmission slot 606, the UE may have to hold an associated repetition/transmission at least until a next non-DMRS bundling slot 602 occurs.

If the second UE proceeds to use the second transmission slot 608 without having previously transmitted in the first transmission slot 606, the second UE may alternatively reduce a transmit power in the second transmission slot 608/DMRS bundling slot 604 by Y dB to avoid having the total transmission power in the first transmission slot 606 being less than the total transmission power in the second transmission slot 608. Thus, the second UE may transmit with very low power in the second transmission slot 608, which may be configured/defined based on a predetermined protocol.

The slot configurations (e.g., DMRS bundling slot 604 v. non-DMRS bundling slot 602) for the first transmission slot 606 and the second transmission slot 608 may be signaled within the resource pool configuration, along with values for X dB and Y dB, to all UEs that are using the resource pool. Hence, the second UE may determine that if the second UE is going to use the second transmission slot 608, the second UE may have to reduce the transmit power of the second UE in the second transmission slot 608. A receiver UE that observes a large power variation may perform DMRS bundling/JCE based on the observation. The receiver UE may use the AGC symbol for performing the DMRS bundling, or the receiver UE may use a portion of the AGC symbol to indicate to the transmitter UE that the receiver UE observed the large power variation and then skip the DMRS bundling.

Figure 7:
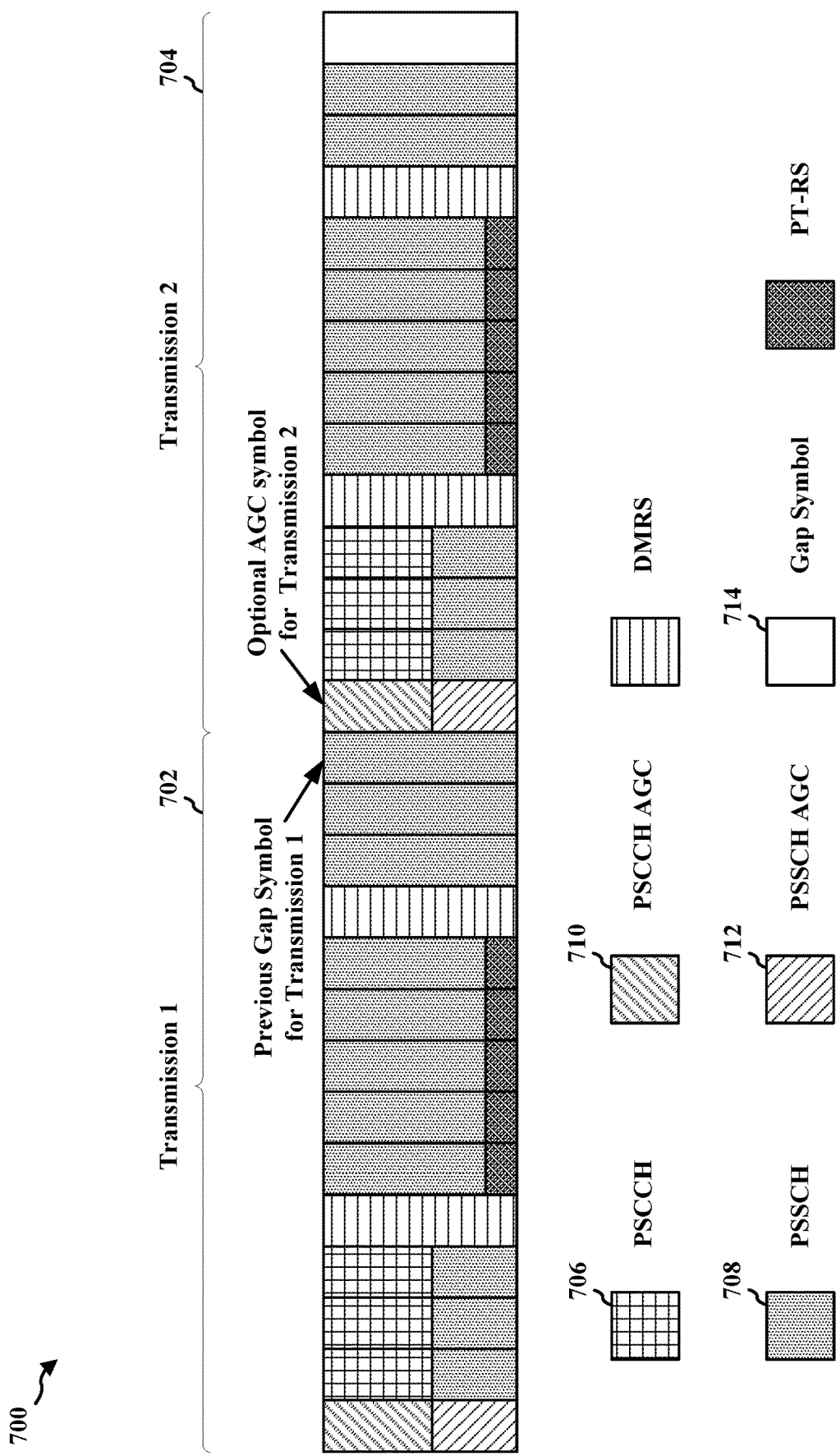
FIG. 7 is a diagram that illustrates transmission repetitions for DMRS bundling based on continuous transmission.

FIG. 7 is a diagram 700 that illustrates transmission repetitions for DMRS bundling based on continuous transmission. Sidelink transmission slots may include a gap symbol 714 in the last symbol of each sidelink transmission slot. Thus, the UE may have to stop transmitting in the last symbol of a sidelink transmission slot when the last symbol of the sidelink transmission slot is reserved for the gap symbol 714. However, if a duration of the gap symbol 714 and/or other time gap (e.g., time gap 506) between a first sidelink transmission 702 and a second sidelink transmission 704 is reduced to 0, the first sidelink transmission 702 and the second sidelink transmission 704 may be contiguous transmissions.

Continuous transmission may assist the UE with maintaining phase continuity, whereas the gap symbol 714 and/or other time gap (e.g., time gap 506) between the first sidelink transmission 702 and the second sidelink transmission 704 may have a negative impact on phase continuity. As such, the UE may be configured to disregard transmission stoppages (e.g., associated with the gap symbol 714) by utilizing a gap symbol previously intended for the first sidelink transmission 702 to transmit information and perform contiguous transmission between the first sidelink transmission 702 and the second sidelink transmission 704.

In some configurations, the UE may omit the AGC symbol including the PSCCH AGC 710 and the PSSCH AGC 712 from the second transmission slot associated with the second sidelink transmission 704/repetition. That is, the AGC symbol may be optional in the second transmission slot for the second sidelink transmission 704/repetition based on a signal variation between the first sidelink transmission 702 and the second sidelink transmission 704 not being larger than a signal variation threshold. The signal variation may be reduced as a result of continuous transmission performed by the UE.

The gap symbol 714 may also be used for switching operations of the transmitter and the receiver. However, when the sidelink transmission slots are associated with contiguous transmission, the operations of the transmitter and the receiver may not have to be switched. SCI carried in the PSCCH 706 may indicate to the receiver one or more occasions where the transmitter will not be stopping transmission in the gap symbol initially intended for the first sidelink transmission 702. That is, the SCI may indicate to the receiver instances of contiguous transmission across at least two slots. The SCI may also indicate occasions where the AGC symbol including the PSCCH AGC 710 and the PSSCH AGC 712 is to be omitted from the second transmission slot.

In other examples, the gap symbol 714 of the first transmission slot may be a duplication of the last symbol that included PSSCH 708. The receiver may perform retuning via AGC using the symbol of the first sidelink transmission slot that was previously intended for the gap symbol, whereas the transmitter may perform continuous rate matching by using the previously intended gap symbol as a valid resource symbol. The transmitter may transmit new bits in the previously intended gap symbol.

The AGC symbol associated with the first symbol of the second transmission slot may be optional in cases where additional UEs are not allowed to transmit in the second transmission slot without having previously transmitted in the first transmission slot. Otherwise, the AGC symbol may be included in the second transmission slot. In examples, the second transmission slot may be a slot that is reserved for DMRS bundling, and the first transmission slot may be a slot that is not reserved for DMRS bundling. A PT-RS may be included in the transmission slots for tracking a phase change, if any, between the transmission slots.

Figure 8:
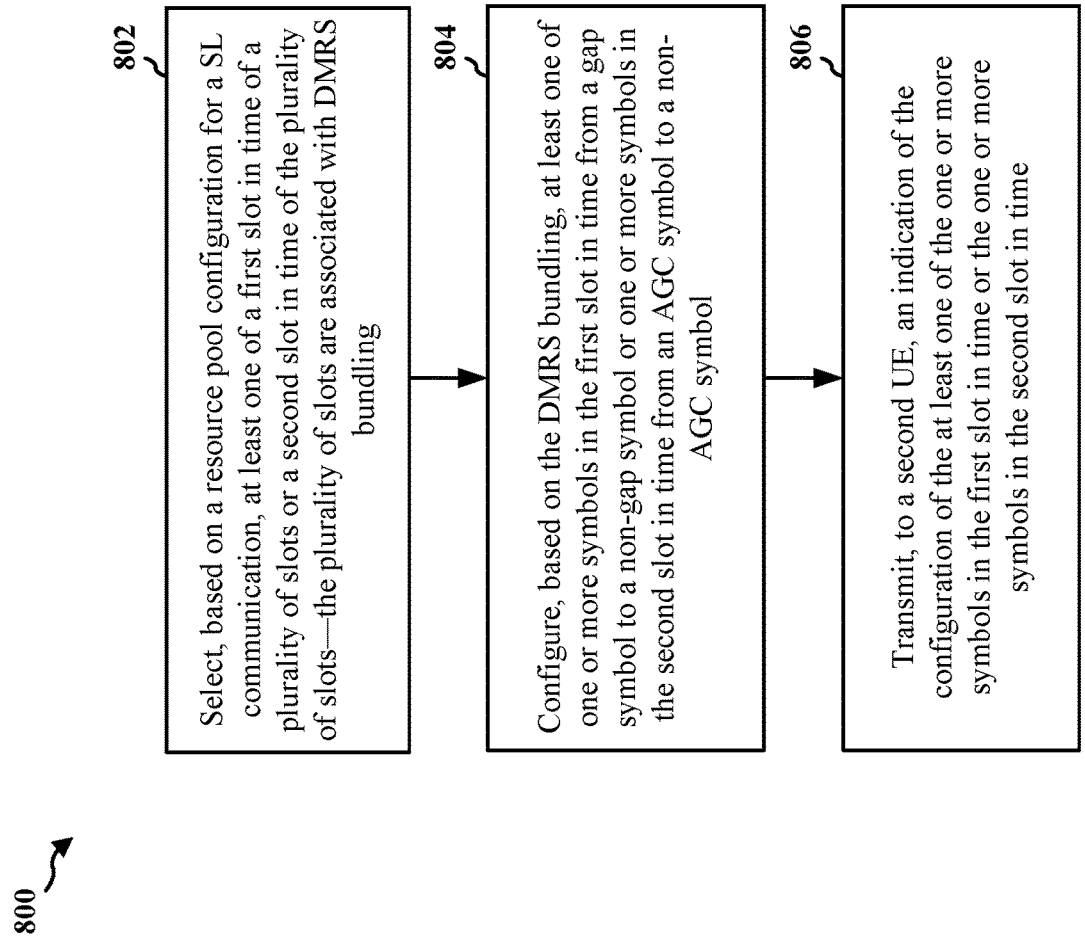
FIG. 8 is a flowchart of a method of wireless communication at a first UE.

FIG. 8 is a flowchart 800 of a method of wireless communication at a first UE. The method may be performed by a UE (e.g., the UE 104/402; the apparatus 1202; etc.), which may include the memory 360 and which may be the entire UE 104/402 or a component of the UE 104/402, such as the TX processor 368, the RX processor 356, and/or the controller/processor 359.

At 802, the first UE may select, based on a resource pool configuration for a SL communication, at least one of a first slot in time of a plurality of slots or a second slot in time of the plurality of slots—the plurality of slots are associated with DMRS bundling. For example, referring to FIGS. 4 and 6, the first UE 402 may select, at 408, DMRS bundling slots based on the resource pool configuration received, at 406*a*. The plurality of slots may correspond to the DMRS bundling slot 604 of the second transmission slot 608 and the non-DMRS bundling slot 602 of the first transmission slot 606. The selection, at 802, may be performed by the DMRS bundling configuration component 1240 of the apparatus 1202 in FIG. 12.

At 804, the first UE may configure, based on the DMRS bundling, at least one of one or more symbols in the first slot in time from a gap symbol to a non-gap symbol or one or more symbols in the second slot in time from an AGC symbol to a non-AGC symbol. For example, referring to FIGS. 4 and 7, the first UE 402 may configure, at 410, symbol(s) of the slots for DMRS bundling. In the diagram 700, a last symbol of the first transmission slot for the first sidelink transmission 702 may be configured for PSSCH 708, rather than as a gap symbol 714. Further, the first symbol of the second transmission slot for the second sidelink transmission 704 may be optionally configured as an AGC symbol. The configuration, at 804, may be performed by the DMRS bundling configuration component 1240 of the apparatus 1202 in FIG. 12.

At 806, the first UE may transmit, to a second UE, an indication of the configuration of the at least one of the one or more symbols in the first slot in time or the one or more symbols in the second slot in time. For example, referring to FIG. 4, the first UE 402 may transmit, at 412, an indication of the DMRS bundling configuration to the second UE 404. The transmission, at 806, may be performed by the DMRS bundling configuration component 1240 of the apparatus 1202 in FIG. 12.

Figure 9:
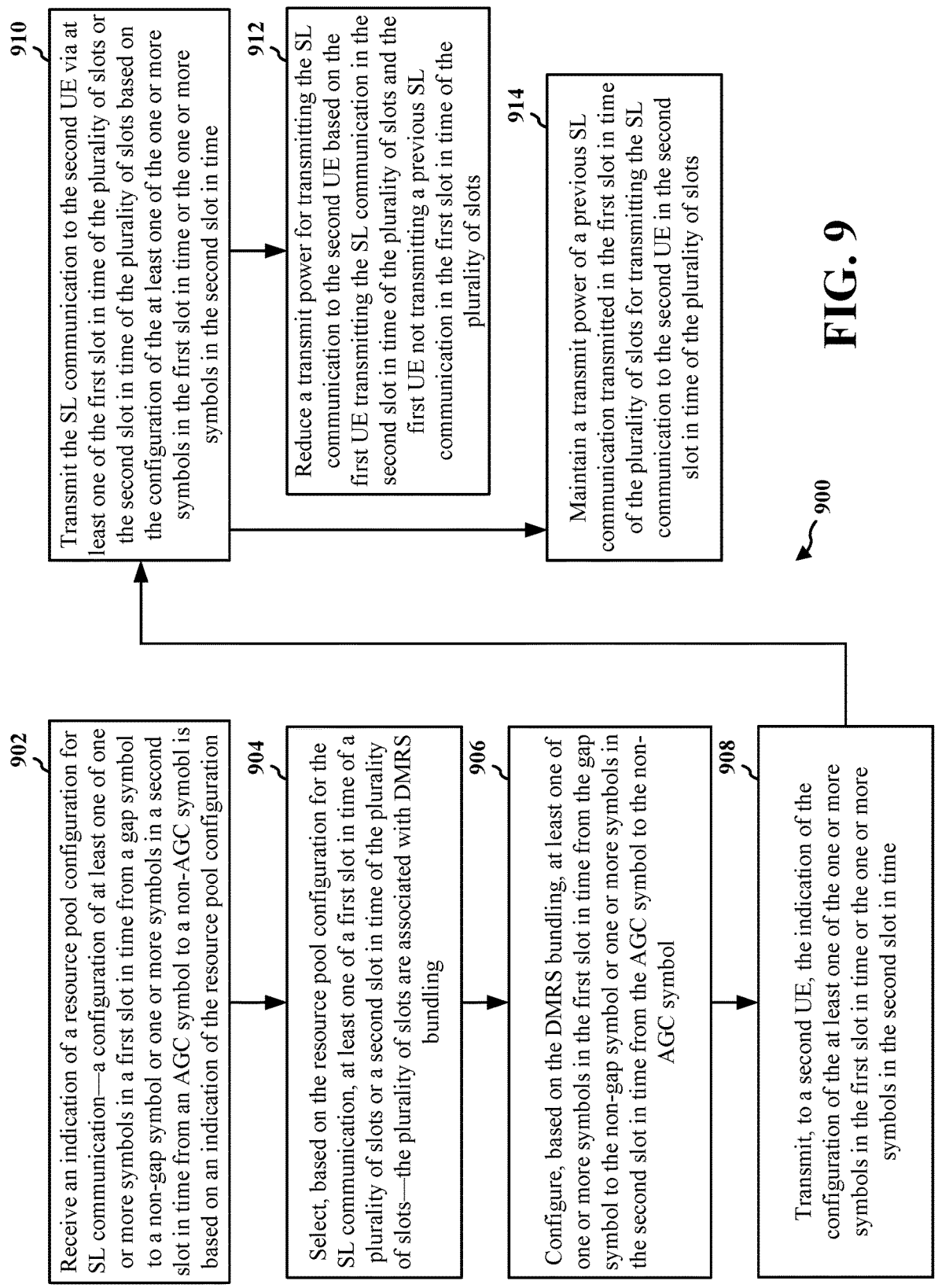
FIG. 9 is a flowchart of a method of wireless communication at a first UE.

FIG. 9 is a flowchart 900 of a method of wireless communication at a first UE. The method may be performed by a UE (e.g., the UE 104/402; the apparatus 1202; etc.), which may include the memory 360 and which may be the entire UE 104/402 or a component of the UE 104/402, such as the TX processor 368, the RX processor 356, and/or the controller/processor 359.

At 902, the first UE may receive an indication of a resource pool configuration for SL communication—a configuration of at least one of one or more symbols in a first slot in time from a gap symbol to a non-gap symbol or one or more symbols in a second slot in time from an AGC symbol to a non-AGC symbol is based on an indication of the resource pool configuration. For example, referring to FIG. 4, the first UE 402 may receive, at 406*a*, a resource pool configuration for configuring a resource pool. The indication of the resource pool configuration may be received, at 406*a*, from at least one of a base station 403*a*, an RSU 403*b*, a third UE 403*c*, or the second UE 404. The reception, at 902, may be performed by the reception component 1230 of the apparatus 1202 in FIG. 12.

At 904, the first UE may select, based on the resource pool configuration for the SL communication, at least one of a first slot in time of a plurality of slots or a second slot in time of the plurality of slots, the plurality of slots associated with DMRS bundling. For example, referring to FIGS. 4 and 6, the first UE 402 may select, at 408, DMRS bundling slots based on the resource pool configuration received, at 406*a*. The plurality of slots may correspond to the DMRS bundling slot 604 of the second transmission slot 608 and the non-DMRS bundling slot 602 of the first transmission slot 606. The resource pool configuration received, at 406*a*, may be associated with at least one of the first slot in time (e.g., first transmission slot 606) of the plurality of slots or the second slot in time (e.g., second transmission slot 608) of the plurality of slots. The selection, at 904, may be performed by the DMRS bundling configuration component 1240 of the apparatus 1202 in FIG. 12.

At 906, the first UE may configure, based on the DMRS bundling, at least one of one or more symbols in the first slot in time from the gap symbol to the non-gap symbol or one or more symbols in the second slot in time from the AGC symbol to the non-AGC symbol. For example, referring to FIGS. 4 and 7, the first UE 402 may configure, at 410, symbol(s) of the slots for DMRS bundling. In the diagram 700, a last symbol of the first transmission slot for the first sidelink transmission 702 may be configured for PSSCH 708, rather than as a gap symbol 714. Further, the first symbol of the second transmission slot for the second sidelink transmission 704 may be optionally configured as an AGC symbol. The configuration (e.g., at 410) of the one or more symbols in the first slot in time of the plurality of slots may be associated with at least one of the gap symbol 714 or a feedback symbol of the first slot in time of the plurality of slots. The gap symbol 714 may correspond to at least one of a rate matching symbol or a last symbol that includes PSSCH 708. The configuration (e.g., at 410) of the one or more symbols associated with the at least one of the gap symbol 714 or the feedback symbol may be indicated, at 412, via SCI. The one or more symbols in the second slot in time of the plurality of slots may correspond to a first symbol of the second slot in time (e.g., PSCCH AGC 710 and/or PSSCH AGC 712). The first slot in time of the plurality of slots may be adjacent to the second slot in time of the plurality of slots (e.g., the first sidelink transmission 702 and the second sidelink transmission 704 may be contiguous transmissions). The configuration, at 906, may be performed by the DMRS bundling configuration component 1240 of the apparatus 1202 in FIG. 12.

At 908, the first UE may transmit, to a second UE, the indication of the configuration of the at least one of the one or more symbols in the first slot in time or the one or more symbols in the second slot in time. For example, referring to FIG. 4, the first UE 402 may transmit, at 412, an indication of the DMRS bundling configuration to the second UE 404. The transmission, at 908, may be performed by the DMRS bundling configuration component 1240 of the apparatus 1202 in FIG. 12.

At 910, the first UE may transmit the SL communication to the second UE via at least one of the first slot in time of the plurality of slots or the second slot in time of the plurality of slots based on the configuration of the at least one of the one or more symbols in the first slot in time or the one or more symbols in the second slot in time. For example, referring to FIG. 4, the first UE 402 may transmit, at 414, a SL communication to the second UE 404 based on the DMRS bundling configuration indicated, at 412, to the second UE 404. For instance, the SL communication may occur in symbol(s) of the slots configured, at 410, by the first UE 402 for DMRS bundling. The transmission, at 910, may be performed by the transmission component 1234 of the apparatus 1202 in FIG. 12.

At 912, the first UE may reduce a transmit power for transmitting the SL communication to the second UE based on the first UE transmitting the SL communication in the second slot in time of the plurality of slots and the first UE not transmitting a previous SL communication in the first slot in time of the plurality of slots. For example, referring to FIGS. 4 and 6, if the first UE 402 transmitted in a first slot in time, the first UE 402 may maintain a transmit power for transmitting, at 416b, a sidelink communication in a second slot in time. In the diagram 600, if the UE transmitted in the first transmission slot 606, the UE may maintain a same transmit power for transmitting in the second transmission slot 608. The reduction, at 912, may be performed by the reduction component 1244 of the apparatus 1202 in FIG. 12.

At 914, the first UE may alternatively maintain a transmit power of a previous SL communication transmitted in the first slot in time of the plurality of slots for transmitting the SL communication to the second UE in the second slot in time of the plurality of slots. For example, referring to FIGS. 4 and 6, if the first UE 402 did not transmit in the first slot in time, the first UE 402 may reduce a transmit power for transmitting, at 416a, the sidelink communication in the second slot in time. In the diagram 600, if the UE did not transmit in the first transmission slot 606, the UE may reduce a transmit power for transmitting in the second transmission slot 608. The maintaining, at 914, may be performed by the maintenance component 1246 of the apparatus 1202 in FIG. 12.

Figure 10:
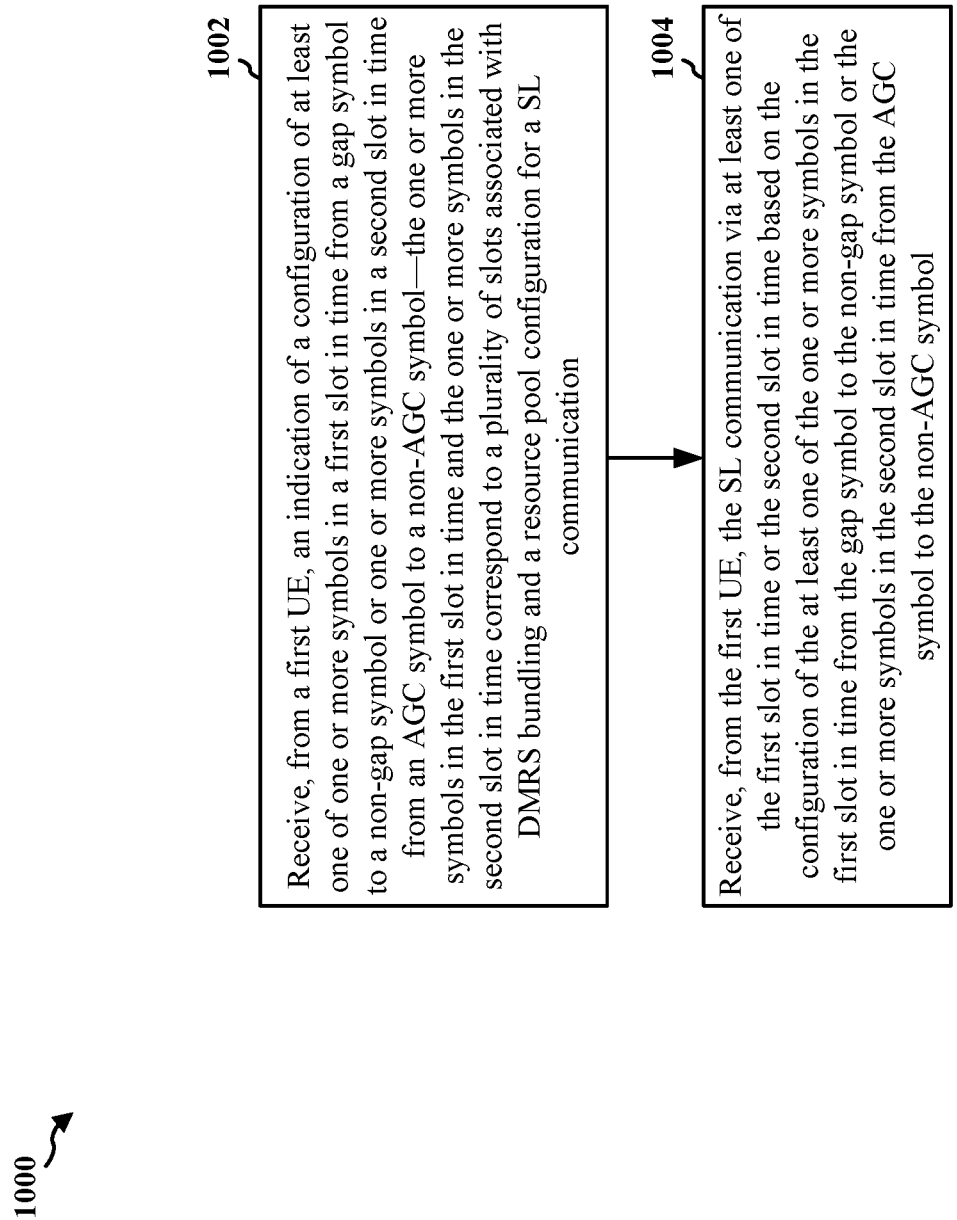
FIG. 10 is a flowchart of a method of wireless communication at a second UE.

FIG. 10 is a flowchart 1000 of a method of wireless communication at a second UE. The method may be performed by a UE (e.g., the UE 104/404; the apparatus 1202; etc.), which may include the memory 360 and which may be the entire UE 104/404 or a component of the UE 104/404, such as the TX processor 368, the RX processor 356, and/or the controller/processor 359.

At 1002, the second UE may receive, from a first UE, an indication of a configuration of at least one of one or more symbols in a first slot in time from a gap symbol to a non-gap symbol or one or more symbols in a second slot in time from an AGC symbol to a non-AGC symbol—the one or more symbols in the first slot in time and the one or more symbols in the second slot in time correspond to a plurality of slots is associated with DMRS bundling and a resource pool configuration for a SL communication. For example, referring to FIGS. 4 and 7, the second UE 404 may receive, at 412, an indication of the DMRS bundling configuration from the first UE 402. In the diagram 700, a gap symbol 714 initially associated with a last symbol of the first transmission slot for the first sidelink transmission 702 may be configured for PSSCH 708. Further, the first symbol of the second transmission slot for the second sidelink transmission 704 may be optionally configured as an AGC symbol. The reception, at 1002, may be performed by the bundled DMRS receiver component 1242 of the apparatus 1202 in FIG. 12.

At 1004, the second UE may receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol. For example, referring to FIG. 4, the second UE 404 may receive, at 414, a SL communication from the first UE 402 based on the DMRS bundling configuration received, at 412, from the first UE 402. For instance, the SL communication may occur in symbol(s) of the slots configured, at 410, by the first UE 402 for DMRS bundling. The reception, at 1004, may be performed by the bundled DMRS receiver component 1242 of the apparatus 1202 in FIG. 12.

Figure 11:
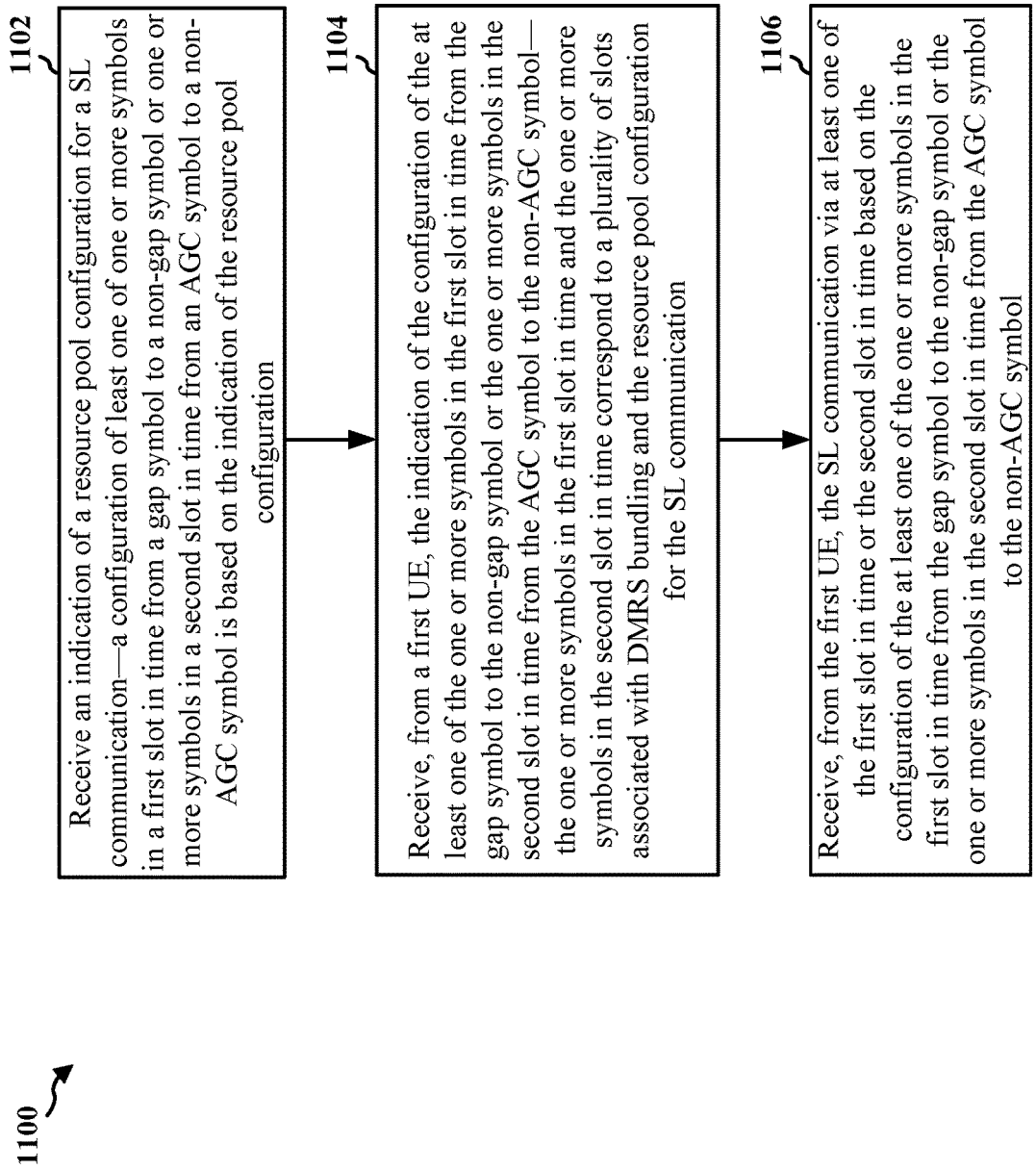
FIG. 11 is a flowchart of a method of wireless communication at a second UE.

FIG. 11 is a flowchart 1100 of a method of wireless communication at a second UE. The method may be performed by a UE (e.g., the UE 104/404; the apparatus 1202; etc.), which may include the memory 360 and which may be the entire UE 104/404 or a component of the UE 104/404, such as the TX processor 368, the RX processor 356, and/or the controller/processor 359.

At 1102, the second UE may receive an indication of a resource pool configuration for a SL communication—a configuration of least one of one or more symbols in a first slot in time from a gap symbol to a non-gap symbol or one or more symbols in a second slot in time from an AGC symbol to a non-AGC symbol is based on the indication of the resource pool configuration. For example, referring to FIG. 4, the second UE 404 may receive, at 406b, a resource pool configuration for a resource pool. The indication of the resource pool configuration may be received, at 406b, from at least one of a base station 403a, an RSU 403b, a third UE 403c, or the first UE 402. The reception, at 1102, may be performed by the reception component 1230 of the apparatus 1202 in FIG. 12.

At 1104, the second UE may receive, from a first UE, the indication of the configuration of the at least one of the one or more symbols in the first slot in time from the gap symbol to the non-gap symbol or the one or more symbols in the second slot in time from the AGC symbol to the non-AGC symbol—the one or more symbols in the first slot in time and the one or more symbols in the second slot in time correspond to a plurality of slots associated with DMRS bundling and the resource pool configuration for the SL communication. For example, referring to FIGS. 4 and 6-7, the second UE 404 may receive, at 412, an indication of the DMRS bundling configuration from the first UE 402. In the diagram 700, a gap symbol 714 initially associated with a last symbol of the first transmission slot for the first sidelink transmission 702 may be configured for PSSCH 708. Further, the first symbol of the second transmission slot for the second sidelink transmission 704 may be optionally configured as an AGC symbol. The reception, at 1104, may be performed by the bundled DMRS receiver component 1242 of the apparatus 1202 in FIG. 12.

The resource pool configuration received, at 406b, may be associated with at least one of the first slot in time (e.g., first transmission slot 606) of the plurality of slots or the second slot in time (e.g., second transmission slot 608) of the plurality of slots. The configuration (e.g., at 410) of the one or more symbols in the first slot in time of the plurality of slots may be associated with at least one of the gap symbol 714 or a feedback symbol of the first slot in time of the plurality of slots. The gap symbol 714 may correspond to at least one of a rate matching symbol or a last symbol that includes PSSCH 708. The configuration (e.g., at 410) of the one or more symbols associated with the at least one of the gap symbol 714 or the feedback symbol may be indicated, at 412, via SCI. The one or more symbols in the second slot in time of the plurality of slots may correspond to a first symbol of the second slot in time (e.g., PSCCH AGC 710 and/or PSSCH AGC 712). The first slot in time of the plurality of slots may be adjacent to the second slot in time of the plurality of slots (e.g., the first sidelink transmission 702 and the second sidelink transmission 704 may be contiguous transmissions).

At 1106, the second UE may receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC to the non-AGC symbol. For example, referring to FIG. 4, the second UE 404 may receive, at 414, a SL communication from the first UE 402 based on the DMRS bundling configuration received, at 412, from the first UE 402. For instance, the SL communication may occur in symbol(s) of the slots configured, at 410, by the first UE 402 for DMRS bundling. A transmit power of the SL communication received, at 414, from the first UE 402 may be reduced based on receiving the SL communication, at 416b, in the second slot in time of the plurality of slots and not receiving a previous SL communication in the first slot in time of the plurality of slots. Alternatively, a transmit power of a previous SL communication received in the first slot in time of the plurality of slots may be maintained for the SL communication received, at 416a, from the first UE 402 in the second slot in time of the plurality of slots (e.g., when the first UE 402 transmitted in the first slot in time). The reception, at 1106, may be performed by the bundled DMRS receiver component 1242 of the apparatus 1202 in FIG. 12.

Figure 12:
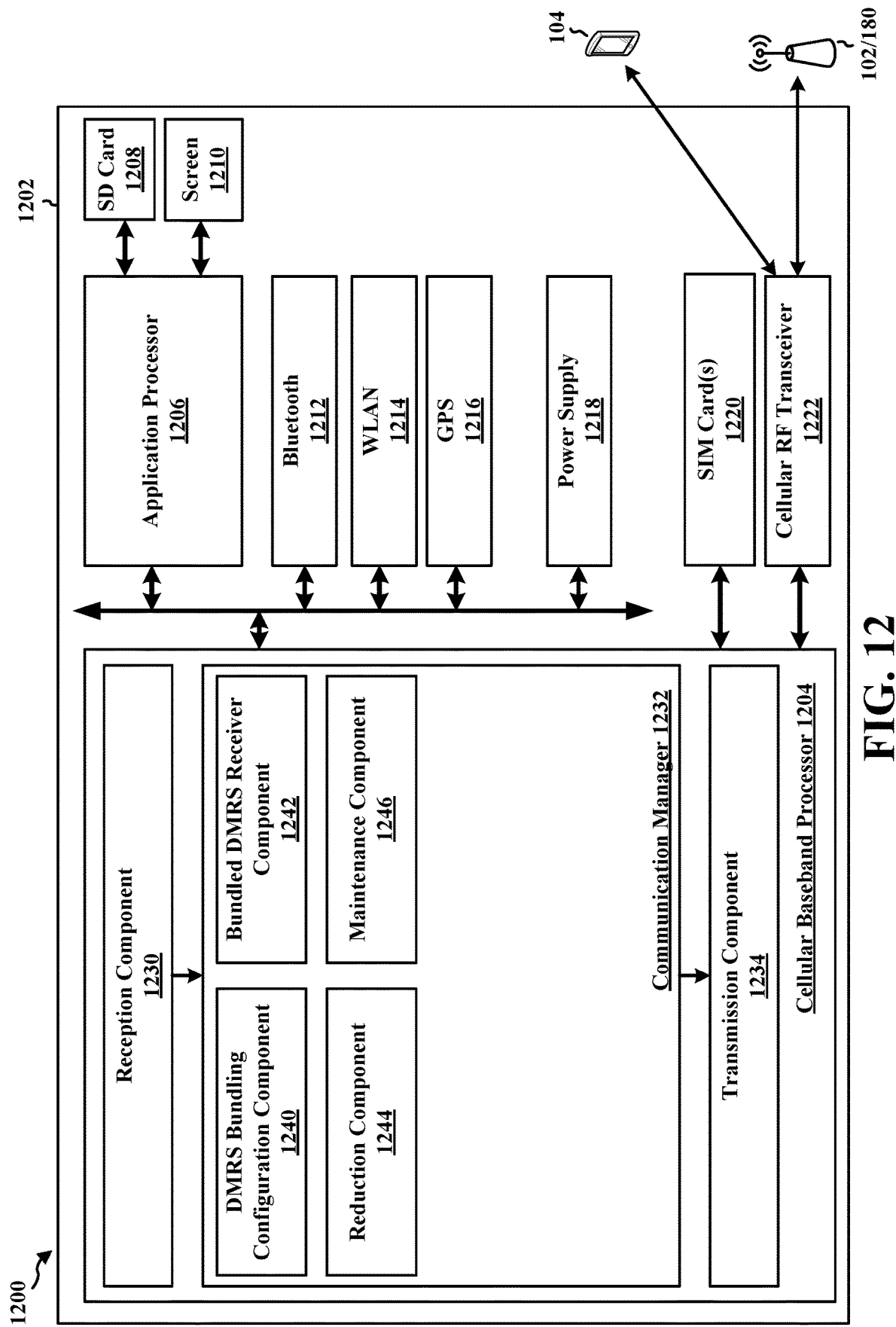
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a DMRS bundling configuration component 1240 that is configured, e.g., as described in connection with 802, 804, 806, 904, 906, and 908, to select, based on a resource pool configuration for a SL communication, at least one of a first slot in time or second slot in time of a plurality of slots, the plurality of slots associated with DMRS bundling; to configure, based on the DMRS bundling, at least one of one or more symbols in the first slot in time from the gap symbol to the non-gap symbol or one or more symbols in the second slot in time from the AGC symbol to the non-AGC symbol; and to transmit, to a second UE, an indication of the configuration of the at least one of the one or more symbols in the first slot in time or the one or more symbols in the second slot in time. The communication manager 1232 further includes a bundled DMRS receiver component 1242 is configured, e.g., as described in connection with 1002, 1004, 1104, and 1106, to receive, from a first UE, an indication of a configuration of at least one of one or more symbols in a first slot in time from a gap symbol to a non-gap symbol or one or more symbols in a second slot in time from an AGC symbol to a non-AGC symbol—the one or more symbols in the first slot in time and the one or more symbols in the second slot in time correspond to a plurality of slots associated with DMRS bundling and a resource pool configuration for a SL communication; and to receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol.

The communication manager 1232 further includes a reduction component 1244 that is configured, e.g., as described in connection with 912, to reduce a transmit power for transmitting the SL communication to the second UE based on the first UE transmitting the SL communication in the second slot in time of the plurality of slots and the first UE not transmitting a previous SL communication in the first slot in time of the plurality of slots. The communication manager 1232 further includes a maintenance component 1246 that is configured, e.g., as described in connection with 914, to maintain a transmit power of a previous SL communication transmitted in the first slot in time of the plurality of slots for transmitting the SL communication to the second UE in the second slot in time of the plurality of slots. The reception component 1230 is configured, e.g., as described in connection with 902 and 1102, to receive an indication of a resource pool configuration for SL communication—a configuration of at least one of one or more symbols in a first slot in time from a gap symbol to a non-gap symbol or one or more symbols in a second slot in time from an AGC symbol to a non-AGC symbol is based on an indication of the resource pool configuration. The transmission component 1234 is configured, e.g., as described in connection with 910, to transmit the SL communication to the second UE via at least one of the first slot in time of the plurality of slots or the second slot in time of the plurality of slots based on the configuration of the at least one of the one or more symbols in the first slot in time or the one or more symbols in the second slot in time.

The apparatus may include additional components that perform each of the blocks of the algorithm in the flowcharts of FIGS. 8-11. As such, each block in the flowcharts of FIGS. 8-11 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1202, which may be at a Tx UE (e.g., first UE) or an Rx UE (e.g., second UE), may include a variety of components configured for various functions. In a first configuration, the apparatus 1202, and in particular the cellular baseband processor 1204, includes means for selecting, based on a resource pool configuration for a SL communication, at least one of a first slot in time of a plurality of slots or a second slot in time of the plurality of slots, the plurality of slots associated with DMRS bundling; means for configuring, based on the DMRS bundling, at least one of one or more symbols in the first slot in time from the gap symbol to the non-gap symbol or one or more symbols in the second slot in time from the AGC symbol to the non-AGC symbol; and means for transmitting, to a second UE, an indication of the configuration of the at least one of the one or more symbols in the first slot in time or the one or more symbols in the second slot in time. The apparatus 1202 further includes means for receiving an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration. The apparatus 1202 further includes means for transmitting the SL communication to the second UE via at least one of the first slot in time of the plurality of slots or the second slot in time of the plurality of slots based on the configuration of the at least one of the one or more symbols in the first slot in time or the one or more symbols in the second slot in time. The apparatus 1202 further includes means for reducing a transmit power for transmitting the SL communication to the second UE based on the first UE transmitting the SL communication in the second slot in time of the plurality of slots and the first UE not transmitting a previous SL communication in the first slot in time of the plurality of slots. The apparatus 1202 further includes means for maintaining a transmit power of a previous SL communication transmitted in the first slot in time of the plurality of slots for transmitting the SL communication to the second UE in the second slot in time of the plurality of slots.

In a second configuration, the apparatus 1202, and in particular the cellular baseband processor 1204, includes means for receiving, from a first UE, an indication of a configuration of at least one of one or more symbols in a first slot in time from a gap symbol to a non-gap symbol or one or more symbols in a second slot in time from an AGC symbol to a non-AGC symbol, the one or more symbols in the first slot in time and the one or more symbols in the second slot in time corresponding to a plurality of slots associated with DMRS bundling and a resource pool configuration for a SL communication; and means for receiving, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol. The apparatus 1202 further includes means for receiving an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to select, based on a resource pool configuration for a SL communication, at least one of a first slot in time of a plurality of slots or a second slot in time of the plurality of slots, the plurality of slots associated with DMRS bundling; configure, based on the DMRS bundling, at least one of one or more symbols in the first slot in time from a gap symbol to a non-gap symbol or one or more symbols in the second slot in time from an AGC symbol to a non-AGC symbol; and transmit, to a second UE, an indication of the configuration of the at least one of the one or more symbols in the first slot in time or the one or more symbols in the second slot in time.

Aspect 2 may be combined with aspect 1 and includes that the at least one processor is further configured to receive an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

Aspect 3 may be combined with any of aspects 1-2 and includes that the indication of the resource pool configuration is received from at least one of a base station, a third UE, or a RSU.

Aspect 4 may be combined with any of aspects 1-3 and includes that the resource pool configuration is associated with at least one of the first slot in time of the plurality of slots or the second slot in time of the plurality of slots.

Aspect 5 may be combined with any of aspects 1-4 and includes that the configuration of the one or more symbols in the first slot in time of the plurality of slots is associated with at least one of the gap symbol or a feedback symbol of the first slot in time of the plurality of slots.

Aspect 6 may be combined with any of aspects 1-5 and includes that the gap symbol corresponds to at least one of a rate matching symbol or a last PSSCH symbol.

Aspect 7 may be combined with any of aspects 1-6 and includes that the configuration of the one or more symbols associated with the at least one of the gap symbol or the feedback symbol is indicated via SCI.

Aspect 8 may be combined with any of aspects 1-7 and includes that the one or more symbols in the second slot in time of the plurality of slots correspond to a first symbol of the second slot in time.

Aspect 9 may be combined with any of aspects 1-8 and includes that the first slot in time of the plurality of slots is adjacent to the second slot in time of the plurality of slots.

Aspect 10 may be combined with any of aspects 1-9 and includes that the at least one processor is further configured to transmit the SL communication to the second UE via at least one of the first slot in time of the plurality of slots or the second slot in time of the plurality of slots based on the configuration of the at least one of the one or more symbols in the first slot in time or the one or more symbols in the second slot in time.

Aspect 11 may be combined with any of aspects 1-10 and includes that the at least one processor is further configured to reduce a transmit power for transmitting the SL communication to the second UE based on the first UE transmitting the SL communication in the second slot in time of the plurality of slots and the first UE not transmitting a previous SL communication in the first slot in time of the plurality of slots.

Aspect 12 may be combined with any of aspects 1-10 and includes that the at least one processor is further configured to maintain a transmit power of a previous SL communication transmitted in the first slot in time of the plurality of slots for transmitting the SL communication to the second UE in the second slot in time of the plurality of slots.

Aspect 13 may be combined with any of aspects 1-12 and further includes a transceiver coupled to the at least one processor.

Aspect 14 is an apparatus for wireless communication at a second UE including at least one processor coupled to a memory and configured to receive, from a first UE, an indication of a configuration of at least one of one or more symbols in a first slot in time from a gap symbol to a non-gap symbol or one or more symbols in a second slot in time from an AGC symbol to a non-AGC symbol, the one or more symbols in the first slot in time and the one or more symbols in the second slot in time corresponding to a plurality of slots associated with DMRS bundling and a resource pool configuration for a SL communication; and receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol.

Aspect 15 may be combined with aspect 14 and includes that the at least one processor is further configured to receive an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

Aspect 16 may be combined with any of aspects 14-15 and includes that the indication of the resource pool configuration is received from at least one of a base station, a third UE, or a RSU.

Aspect 17 may be combined with any of aspects 14-16 and includes that the resource pool configuration is associated with at least one of the first slot in time of the plurality of slots or the second slot in time of the plurality of slots.

Aspect 18 may be combined with any of aspects 14-17 and includes that the configuration of the one or more symbols in the first slot in time of the plurality of slots is associated with at least one of the gap symbol or a feedback symbol of the first slot in time of the plurality of slots.

Aspect 19 may be combined with any of aspects 14-18 and includes that the gap symbol corresponds to at least one of a rate matching symbol or a last PSSCH symbol.

Aspect 20 may be combined with any of aspects 14-19 and includes that the configuration of the one or more symbols associated with the at least one of the gap symbol or the feedback symbol is indicated via SCI.

Aspect 21 may be combined with any of aspects 14-20 and includes that the one or more symbols in the second slot in time of the plurality of slots correspond to a first symbol of the second slot in time.

Aspect 22 may be combined with any of aspects 14-21 and includes that the first slot in time of the plurality of slots is adjacent to the second slot in time of the plurality of slots.

Aspect 23 may be combined with any of aspects 14-22 and includes that a transmit power of the SL communication received from the first UE is reduced based on receiving the SL communication in the second slot in time of the plurality of slots and not receiving a previous SL communication in the first slot in time of the plurality of slots.

Aspect 24 may be combined with any of aspects 14-22 and includes that a transmit power of a previous SL communication received in the first slot in time of the plurality of slots is maintained for the SL communication received from the first UE in the second slot in time of the plurality of slots.

Aspect 25 may be combined with any of aspects 14-24 and further includes a transceiver coupled to the at least one processor.

Aspect 26 is a method of wireless communication for implementing any of aspects 1-25.

Aspect 27 is an apparatus for wireless communication including means for implementing any of aspects 1-25.

Aspect 28 is a computer-readable medium storing computer executable code, the code when executed by at least one processor causes the at least one processor to implement any of aspects 1-25.

What is claimed is:

1. An apparatus for wireless communication at a first user equipment (UE), comprising:
    a memory; and
    at least one processor coupled to the memory and configured to:
        select, based on a resource pool configuration for a sidelink (SL) communication, at least one of a first slot in time of a plurality of slots or a second slot in time of the plurality of slots, the plurality of slots associated with demodulation reference signal (DMRS) bundling;
        configure, based on the DMRS bundling, at least one of one or more symbols in the first slot in time from a gap symbol to a non-gap symbol or one or more symbols in the second slot in time from an automatic gain control (AGC) symbol to a non-AGC symbol; and
        transmit, to a second UE, an indication of the configuration of the at least one of the one or more symbols in the first slot in time or the one or more symbols in the second slot in time.

2. The apparatus of claim 1, wherein the at least one processor is further configured to receive an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

3. The apparatus of claim 2, wherein to receive the indication of the resource pool configuration, the at least one processor is configured to receive the indication of the resource pool configuration from at least one of a base station, a third UE, or a roadside unit (RSU).

4. The apparatus of claim 1, wherein the resource pool configuration is associated with at least one of the first slot in time of the plurality of slots or the second slot in time of the plurality of slots.

5. The apparatus of claim 1, wherein the configuration of the one or more symbols in the first slot in time of the plurality of slots is associated with at least one of the gap symbol or a feedback symbol of the first slot in time of the plurality of slots.

6. The apparatus of claim 5, wherein the gap symbol corresponds to at least one of a rate matching symbol or a last physical sidelink shared channel (PSSCH) symbol.

7. The apparatus of claim 5, wherein the configuration of the one or more symbols associated with the at least one of the gap symbol or the feedback symbol is indicated via sidelink control information (SCI).

8. The apparatus of claim 1, wherein the one or more symbols in the second slot in time of the plurality of slots correspond to a first symbol of the second slot in time.

9. The apparatus of claim 1, wherein the first slot in time of the plurality of slots is adjacent to the second slot in time of the plurality of slots.

10. The apparatus of claim 1, wherein the at least one processor is further configured to transmit the SL communication to the second UE via at least one of the first slot in time of the plurality of slots or the second slot in time of the plurality of slots based on the configuration of the at least one of the one or more symbols in the first slot in time or the one or more symbols in the second slot in time.

11. The apparatus of claim 10, wherein the at least one processor is further configured to reduce a transmit power for transmitting the SL communication to the second UE based on the at least one processor being configured to transmit the SL communication in the second slot in time of the plurality of slots and based on the at least one processor being configured to not transmit a previous SL communication in the first slot in time of the plurality of slots.

12. The apparatus of claim 10, wherein the at least one processor is further configured to maintain a transmit power of a previous SL communication transmitted in the first slot in time of the plurality of slots based on the at least one processor being configured to transmit the SL communication to the second UE in the second slot in time of the plurality of slots.

13. The apparatus of claim 1, further comprising a transceiver coupled to the at least one processor.

14. An apparatus for wireless communication at a second user equipment (UE), comprising:
    a memory; and
    at least one processor coupled to the memory and configured to:
        receive, from a first UE, an indication of a configuration of at least one of one or more symbols in a first slot in time from a gap symbol to a non-gap symbol or one or more symbols in a second slot in time from an automatic gain control (AGC) symbol to a non-AGC symbol, the one or more symbols in the first slot in time and the one or more symbols in the second slot in time corresponding to a plurality of slots associated with demodulation reference signal (DMRS) bundling and a resource pool configuration for a sidelink (SL) communication; and
        receive, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol.

15. The apparatus of claim 14, wherein the at least one processor is further configured to receive an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

16. The apparatus of claim 15, wherein to receive the indication of the resource pool configuration, the at least one processor is configured to receive the indication of the resource pool configuration from at least one of a base station, a third UE, or a roadside unit (RSU).

17. The apparatus of claim 14, wherein the resource pool configuration is associated with at least one of the first slot in time of the plurality of slots or the second slot in time of the plurality of slots.

18. The apparatus of claim 14, wherein the configuration of the one or more symbols in the first slot in time of the plurality of slots is associated with at least one of the gap symbol or a feedback symbol of the first slot in time of the plurality of slots.

19. The apparatus of claim 18, wherein the gap symbol corresponds to at least one of a rate matching symbol or a last physical sidelink shared channel (PSSCH) symbol.

20. The apparatus of claim 18, wherein the configuration of the one or more symbols associated with the at least one of the gap symbol or the feedback symbol is indicated via sidelink control information (SCI).

21. The apparatus of claim 14, wherein the one or more symbols in the second slot in time of the plurality of slots correspond to a first symbol of the second slot in time.

22. The apparatus of claim 14, wherein the first slot in time of the plurality of slots is adjacent to the second slot in time of the plurality of slots.

23. The apparatus of claim 14, wherein a transmit power of the SL communication received from the first UE is reduced based on the at least one processor being configured to receive the SL communication in the second slot in time of the plurality of slots and based on the at least one processor being configured to not receive a previous SL communication in the first slot in time of the plurality of slots.

24. The apparatus of claim 14, wherein a transmit power of a previous SL communication received in the first slot in time of the plurality of slots is maintained for the SL communication based on the at least one processor being configured to receive the SL communication from the first UE in the second slot in time of the plurality of slots.

25. The apparatus of claim 14, further comprising a transceiver coupled to the at least one processor.

26. A method of wireless communication at a first user equipment (UE), comprising:
selecting, based on a resource pool configuration for a sidelink (SL) communication, at least one of a first slot in time of a plurality of slots or a second slot in time of the plurality of slots, the plurality of slots associated with demodulation reference signal (DMRS) bundling;
configuring, based on the DMRS bundling, at least one of one or more symbols in the first slot in time from a gap symbol to a non-gap symbol or one or more symbols in the second slot in time from an automatic gain control (AGC) symbol to a non-AGC symbol; and
transmitting, to a second UE, an indication of the configuration of the at least one of the one or more symbols in the first slot in time or the one or more symbols in the second slot in time.

27. The method of claim 26, further comprising receiving an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

28. The method of claim 26, further comprising transmitting the SL communication to the second UE via at least one of the first slot in time of the plurality of slots or the second slot in time of the plurality of slots based on the configuration of the at least one of the one or more symbols in the first slot in time or the one or more symbols in the second slot in time.

29. A method of wireless communication at a second user equipment (UE), comprising:
receiving, from a first UE, an indication of a configuration of at least one of one or more symbols in a first slot in time from a gap symbol to a non-gap symbol or one or more symbols in a second slot in time from an automatic gain control (AGC) symbol to a non-AGC symbol, the one or more symbols in the first slot in time and the one or more symbols in the second slot in time corresponding to a plurality of slots associated with demodulation reference signal (DMRS) bundling and a resource pool configuration for a sidelink (SL) communication; and
receiving, from the first UE, the SL communication via at least one of the first slot in time or the second slot in time based on the configuration of the at least one of the one or more symbols in the first slot in time from the gap symbol to the non-gap symbol or the one or more symbols in the second slot in time from the AGC symbol to the non-AGC symbol.

30. The method of claim 29, further comprising receiving an indication of the resource pool configuration for the SL communication, the configuration of the at least one of the one or more symbols in the first slot in time from the gap symbol to the non-gap symbol or the one or more symbols in the second slot in time from the AGC symbol to the non-AGC symbol is based on the indication of the resource pool configuration.

* * * * *